S. Holt.
Hop Vine Stripper.
N° 79,072. Patented Jun. 23, 1868.
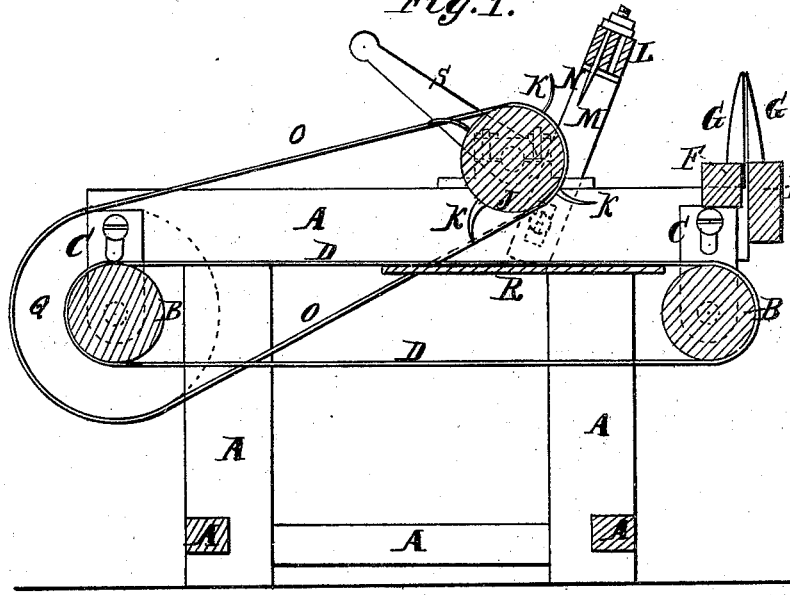
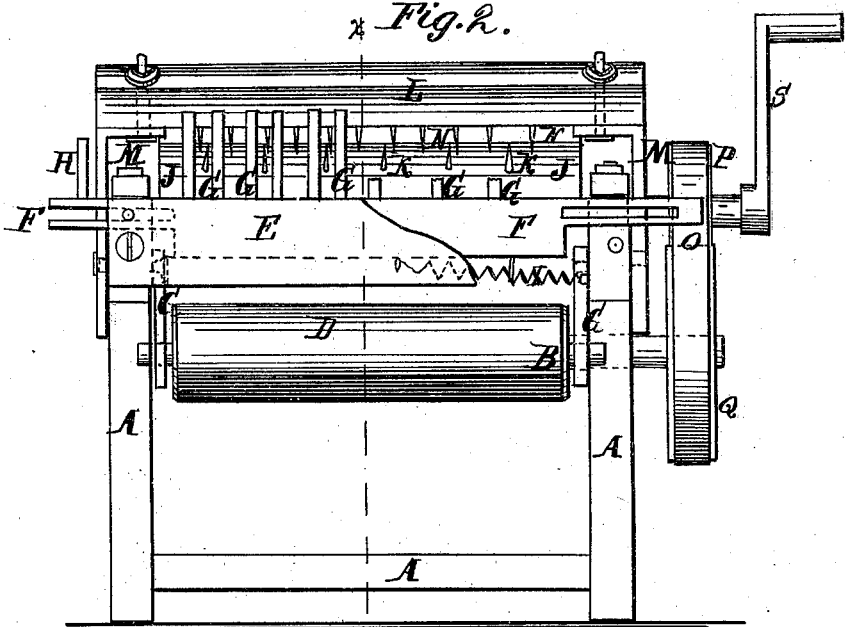
Witnesses  
W. C. Ashkettle  
J. A. Fraser
Inventor  
Sidney Holt  
per Munn & Co.  
attorneys

United States Patent Office.

SIDNEY HOLT, OF BARABOO, WISCONSIN.

Letters Patent No. 79,072, dated June 23, 1868.

IMPROVEMENT IN HOP-STRIPPER.

The Schedule referred to in these Letters Patent and making part of the same.

TO ALL WHOM IT MAY CONCERN:

Be it known that I, SIDNEY HOLT, of Baraboo, in the county of Sauk, and State of Wisconsin, have invented a new and useful Improvement in Hop-Stripper; and I do hereby declare that the following is a full, clear, and exact description thereof, which will enable those skilled in the art to make and use the same, reference being had to the accompanying drawings, forming part of this specification, in which—

Figure 1 is a vertical longitudinal section of my improved machine, taken through the line $x$ $x$, fig. 2.

Figure 2 is an end view of the same, part being broken away to show the construction.

Similar letters of reference indicate corresponding parts.

My invention has for its object to furnish a simple and convenient machine for stripping the hops from the vines, and at the same time breaking the clusters into pieces.

And it consists in the construction and combination of the various parts, as hereinafter more fully described A is the frame of the machine, from the front and rear ends of the horizontal beams of which are suspended two rollers, B.

The journals of the rollers B revolve in bearings in the lower ends of the arms C, the upper ends of which are secured to the horizontal beams of the frame A by screws or bolts, which pass through slots in the said upper ends of the said arms, and screw into the said beams, so that the rollers may be adjusted to a higher or lower level, as may be desired.

D is an endless belt, which passes around the rollers B, to carry the hops from the stripping-device to the sieve or other receptacle.

E and F are two bars, placed side by side at the front end of the machine, and which have upwardly-projecting fingers, G, rigidly attached to them, in such positions as to correspond with each other, as shown in fig. 1.

One of the bars, as E, is rigidly attached to the frame A of the machine, and the other, F, slides back and forth longitudinally upon guides attached to said frame, and the movement of which is limited by stop-pins attached to the bar E, and which enter slots in the bar F, as shown in fig. 2.

The bar F is moved in one direction by means of the handle or lever H attached to it, to remove the corresponding fingers G from each other, so as to insert the vines between the said fingers.

I is a coiled wire spring, one end of which is attached to the frame A, and its other end to the sliding bar F, to draw back the said bar when the vines have been placed between the fingers G, and when the said bar has been released from the hand of the operator.

Then, as the vines are drawn out from between the fingers G, the hops are stripped from the vines by the action of said fingers, and fall down upon the endless belt D.

J is a roller, the journals of which revolve in bearings attached to the upper side of the horizontal beams of the frame A.

The roller J is studded with several rows of curved teeth, K, and motion is given to it by means of a crank, S, attached to the projecting end of one of its journals.

L is a beam, attached to the upper ends of the bars or standards M, which said standards are adjustably attached to the outer sides of the frame A by set-screws, which pass through slots in the ends of the said bars or standards M, and screw into the frame A, so that the said standards M may be adjusted to support the beam L at any desired distance from the roller or cylinder J.

N are teeth, attached to and projecting from the lower side of the beam L, so as to interlock with the teeth K of the roller J.

By this construction, as the hops are carried back by the endless belt or apron D, the fine or broken-up hops pass beneath the roller J, but any clusters that may be upon said belt will be caught by the curved fingers or teeth K, raised and carried over the said roller J, and, by the action of the interlocking fingers K and and N, will be thoroughly torn in pieces, and will then fall back upon the endless belt D.

O is a belt, which passes around the pulley P attached to the journal of the roller J, and around the pulley Q attached to the journal of one of the rollers B, to communicate motion to said roller, and through it to the endless belt D.

R is a platform or stationary apron, attached to the frame A directly beneath the roller J, to hold the upper part of the endless apron or belt D up to its place and prevent its sagging, so that any clusters of hops that may be upon said apron, when passing beneath the said roller, may, without fail, be caught by the teeth or fingers K of said roller or cylinder.

I claim as new, and desire to secure by Letters Patent—

1. The combination and arrangement, upon the frame A, of the fixed and sliding bars E F respectively, substantially as and for the purpose set forth.

2. The combination and arrangement, with relation to the toothed cylinder J, of the endless carrier D, rollers B, and vertically-adjustable hangers C, as herein shown and described, for the purpose specified.

3. The toothed bar L, in combination with the toothed roller J, substantially as and for the purpose herein set forth.

4. The described arrangement upon one frame, A, of the hop-stripping device, consisting of the parts E, F, G, H, I, the breaking-device J K L M N, and the endless carrier D, passing around adjustable rollers B, all constructed and combined to operate in the manner and for the purpose substantially as set forth.

The above specification of my invention signed by me, this 30th day of January, 1868.

<div align="right">SIDNEY HOLT.</div>

Witnesses:
  WM. F. McNAMARA,
  JAMES T. GRAHAM.